United States Patent [19]
Anderson

[11] 3,813,853
[45] June 4, 1974

[54] DUST FILTER
[75] Inventor: Robert J. Anderson, Toledo, Ohio
[73] Assignee: The Andersons, Maumee, Ohio
[22] Filed: Aug. 30, 1971
[21] Appl. No.: 175,936

[52] U.S. Cl.......... 55/96, 55/210, 55/283, 55/294, 55/302, 55/341, 55/379, 55/431
[51] Int. Cl........................... B01d 46/04
[58] Field of Search ......... 55/96, 97, 272, 273, 283, 55/284, 293, 294, 302, 303, 333, 334, 335, 336, 379, 341, 431, 210, 213; 210/323, 333

[56] References Cited
UNITED STATES PATENTS

| 1,548,288 | 8/1925 | Smith | 55/97 |
| 2,576,656 | 11/1951 | Wallin | 55/213 |
| 2,731,107 | 1/1956 | Hersey, Jr. | 55/283 |
| 2,800,976 | 7/1957 | Pellon | 55/302 |
| 2,819,774 | 1/1958 | Schmidt et al. | 55/210 |
| 2,844,216 | 7/1958 | Swanson | 55/302 |
| 2,885,028 | 5/1959 | Sylvan | 55/341 |
| 3,325,979 | 6/1967 | Smith | 55/341 |

FOREIGN PATENTS OR APPLICATIONS

| 635,894 | 3/1962 | Italy | 55/341 |

Primary Examiner—Bernard Nozick
Attorney, Agent, or Firm—Henry K. Leonard

[57] ABSTRACT

A dust filter having a housing that is divided by a horizontal partition into an upper clean gas plenum and a lower contaminated gas plenum. A circumferentially extending plurality of vertical, parallel cells are located in the lower plenum and their upper ends open through the partition into the clean gas plenum. The lower ends of the cells are closed and each contains one or more filter bags which have closed tops and lower ends which open through the closed ends of the cells to the lower contaminated gas plenum. At the lower end of the housing there are two concentric, spaced conical hoppers leading downwardly to dust discharge mechanism. The lower ends of the cells extend below the level of the top of the inner hopper. One or more pressurized contaminated gas ducts lead into the lower plenum. An exhaust duct equipped with a damper leads from the clean gas plenum to atmosphere. A damper actuating device located in the contaminated gas plenum is responsive to the differential between the pressure in the contaminated gas plenum and atmosphere for opening and closing the damper to maintain a substantially constant pressure in the contaminated gas plenum. A clean gas blast generator functions to deliver an impact to a pre-determined volume of clean gas including the gas in one of the cells and a measured volume of clean gas placed in communication with the cell to be cleaned. The blast passes the measured volume of clean gas through the bag or bags in the cell being cleaned for expelling accumulated dust from the cell downwardly into the annular space between the hoppers.

7 Claims, 17 Drawing Figures

INVENTOR:
ROBERT J. ANDERSON.
BY Owen + Owen

ATT'YS.

INVENTOR:
ROBERT J. ANDERSON.
BY Owen & Owen
ATT'YS.

INVENTOR:
ROBERT J. ANDERSON.
BY
ATT'YS.

INVENTOR:
ROBERT J. ANDERSON.

DUST FILTER

BACKGROUND OF THE INVENTION

This invention relates to industrial type dust filters or collectors in which the filter housing contains a plurality of elongated filter bags and contaminated gas such as air is fed from one or more sources into the filter housing and through the filter bags to filter the dust out of the gas.

This field may be divided into two general types, i.e., those in which the contaminated gas passes through the bags from outside to the inside and accumulates the cake of filtered dust on the outsides of the bags and those in which the contaminated gas passes first into the interiors of the bags and then through the bags to their exteriors thus accumulating the filtered dust on the interiors of the bags.

The devices may also be divided into classes which might be called the positive pressure type in which the contaminated gas is fed to the filter under pressure created in the supply ducts and the negative pressure type in which the contaminated gas is pulled through the filter by blower means positioned in the exhaust duct.

In all of the filters of the foregoing types, it is necessary from time to time to clean the accumulated dust from the surfaces of the filter bags to discharge it from the filter bags into a collecting hopper whence it is delivered by discharge mechanisms such as rotary valves, into a collecting bin or dump. Many of the filters of all the foregoing types have continuously operating discharge mechanisms such as rotary valves to continuously discharge the accumulated dust and particles which are cleaned out of the filter bags.

Many types of cleaning mechanisms have been proposed, among them travelling ring jets which move up and down filter bags which collect the dust on their interior surfaces; nozzles of various types which extend into the open ends of bags which collect dust on their exterior surfaces and through which clean gas is discharged to expand the bags and break the dust loose from their exteriors; shaker mechanisms which literally shake the bags to break the cakes of the accumulated dust off of their surfaces.

The objects of the instant invention may be stated briefly, to be:

1. Utilization of baffle means for separation of larger particles by reason of their energy, for example, by introducing abrupt changes in the direction of flow of the contaminated gas en route to the filtering bags.
2. Prevention of re-entrainment of dust once filtered from contaminated gas back into the contaminated gas which must be filtered again.
3. Prevention of the re-deposition of dust previously filtered from contaminated gas by one filtering bag directly onto an adjacent bag during the cleaning operation.
4. Substantially eliminating damage to the filter bags due to abrasion by particles in turbulent gas.
5. Provision for the filtering of a greater volume of gas at any selected pressure drop resulting from the substantial elimination of re-entrainment.
6. Providing for the utilization of coarser filtering media and therefore passage of a greater volume of gas for a given filter efficiency (percentage contaminants removed) by substantially eliminating flexure of the filter media and resulting working therethrough of dust particles.
7. Simplification and reduced cost, both initial and operating, of filter system designs by reason of the ability to filter contaminated gas from a number of independent sources in a single filter apparatus, particularly where not all of the sources are operated simultaneously.
8. Flexibility in system design and reduction of power requirements, by utilization of a single filter apparatus for independent sources rather than lengthy single input ducts for different sources and consequent reduction in transmission loses and elimination of duplication of dust disposal equipment.
9. Elimination of the requirement for compressed air for cleaning with consequent elimination of compressors, motors, controls tanks and air lines.
10. Cleaning the filter without applying damaging forces to the filter bags themselves.
11. Generation of a cleaning blast of gas having a high impact but by means requiring low power.
12. Cleaning with a minimum of total energy, for example ¾ horsepower in a filter of 20,000 c.f.m. capacity.
13. Continued operation of the filter during cleaning cycles with a minimum interruption of normal filtering.
14. Automatic initiation and termination of the cleaning cycle when needed.
15. Reduction of the periods during which a filtered dust discharge mechanism operates, thus to save power.
16. Maintenance of substantially constant pressure drop across the filter even as the filter medium becomes dirty or as the gas flow rate to the filter is varied.
17. Ability to feed contaminated gas from one or several sources simultaneously into a single filter unit without the necessity for rebalancing and without introducing power losses or other inefficiency.
18. Ability to remove old filter bags and install new filter bags while working in the clean side of the filter and without requiring the use of tools or complex operations.

It is another object of the instant invention to provide an industrial type dust collector which prolongs the life of the filter bags by reason of the fact that they are not shaken, expanded, nor subjected to excessive forces either during filtering or during cleaning.

Another object of the instant invention is to provide an industrial type dust collector wherein the flow of cleaning gas and the possible re-entrainment of previously filtered dust particles, is reduced to a negligible minimum; for example, wherein all of the filter bags in a filter which is capable of filtering 20,000 cubic feet of gas per minute can be cleaned by the utilization of only 96 cubic feet per minute of cleaning gas.

A further object of the instant invention is to provide an industrial type dust collector in which the filtered solid particles can be allowed to accumulate for a substantial period of time thereby to obviate the necessity for continuously operating the discharge mechanism.

Another important object of the instant invention is to provide an industrial gas filter of the type wherein the filtered particles accumulate on the inner surface of the filter bags and are expelled from the bags by the application of force to a predetermined volume of gas, including that adjacent the exterior surface of the filter bags, by the delivery thereto of a sharp impact, and the passage through the filter bag or bags being cleaned of a measured quantity of clean gas of small volume.

It is yet another object of the instant invention to provide a blast generating mechanism which requires the expenditure of a small quantity of power and which utilizes gravity for releasing stored mechanical potential energy which is substantially instantaneously converted into an explosion type gas blast for the dislodgement of accumulated filtered dust and the expulsion thereof out of the filter bags.

BRIEF DESCRIPTION OF THE DRAWINGS

FIG. 1 is a side view in elevation with parts broken away and with some parts shown in fragment and phantom of a dust filter embodying the invention;

FIG. 1-A is a fragmentary view, partly in elevation, and partly in section, of a portion of a dust collecting hopper shown on the same scale as FIG. 1, and illustrating a modification of this part of the apparatus;

FIG. 2 is a fragmentary, vertical sectional view taken along the line 2—2 of FIG. 1 and shown on an enlarged scale;

DESCRIPTION OF PREFERRED EMBODIMENT

Figures 1, 1A, 2:
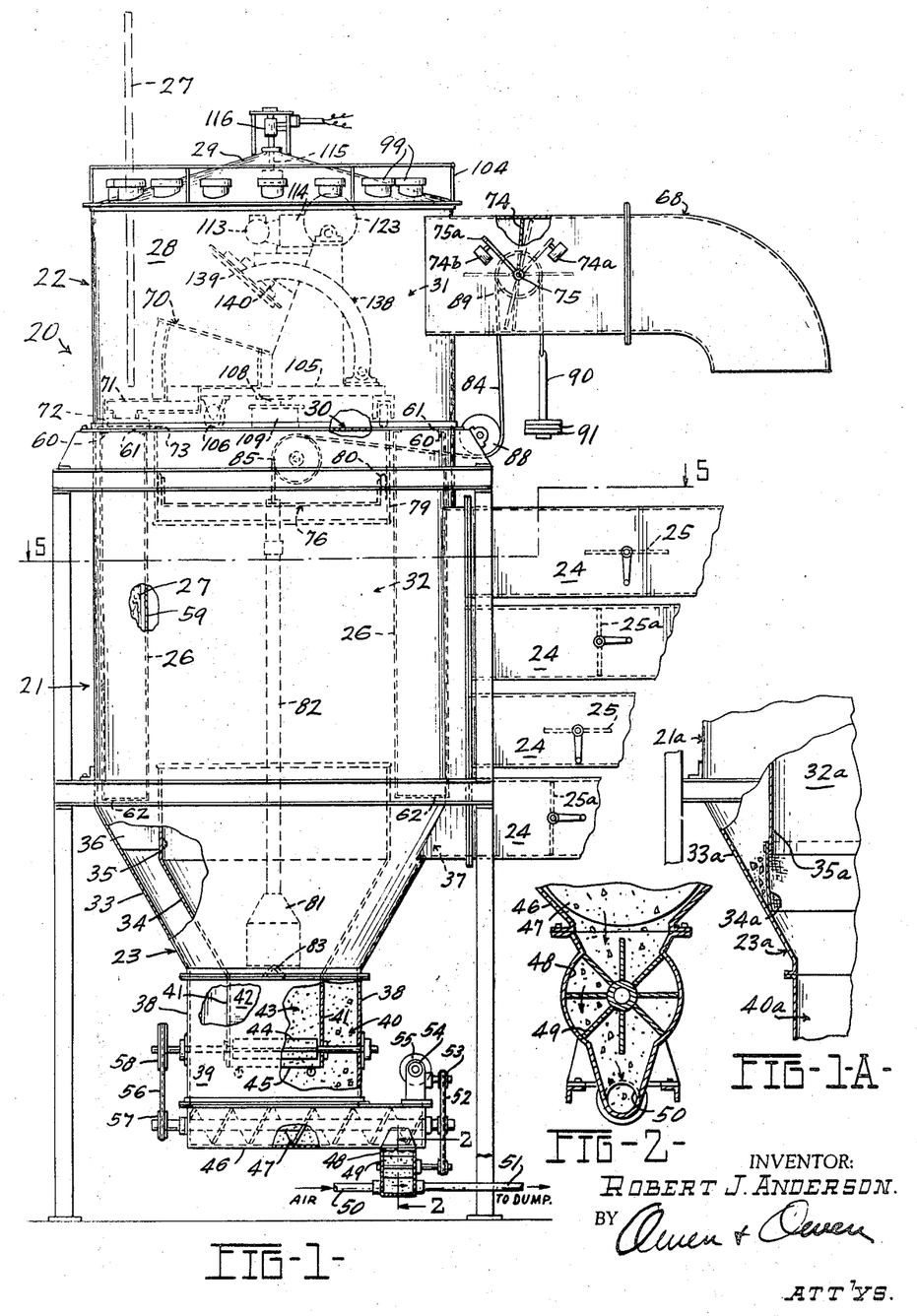

A dust filter embodying the invention is generally illustrated in FIG. 1, and indicated by the reference number 20. The dust filter 20 may be considered as comprising three major, vertically superposed sections, viz. a contaminated gas plenum housing 21 which is generally cylindrical in shape; a clean gas plenum housing 22 mounted atop the housing 21; and a collecting hopper 23 located beneath the housing 21. A plurality of input contaminated gas ducts 24 are connected into the housing 21 for the delivery thereto of contaminated gas under pressure from different sources. While many aspects of the instant invention are pertinent to what might be called "negative pressure" dust filtering apparatuses, the instant embodiment is designed and constructed for filtering of particulate solid materials, i.e., "dust" from contaminated gas delivered to the input ducts 24 under pressure by suitable blowers or fans (not shown).

Each of the ducts 24 has a damper, the dampers being indicated by reference numbers 25 for those dampers which are shown in open position and 25a for those dampers which are shown in closed position. With respect to the ducts 24 and dampers 25, the situation illustrated in FIG. 1 would exist when the two ducts 24 shown with their dampers 25 fully open are being operated to deliver contaminated gas from two separate originating sources. In this illustrated situation, the originating sources from which the other two ducts 24 lead and where the dampers 25a are shown in closed position, are not in operation. As will later be more fully explained, a dust filter embodying the invention operates according to its designed pressure and system with equal efficiency regardless of the number of the sources for contaminated gas fed to the ducts 24 which are in operation, i.e., whether one, two, three or four of the ducts 24 are open and feeding contaminated gas to the filter 20. However, as illustrated in FIG. 1, the filter 20 as a whole is shown in operative condition.

Figure 5:
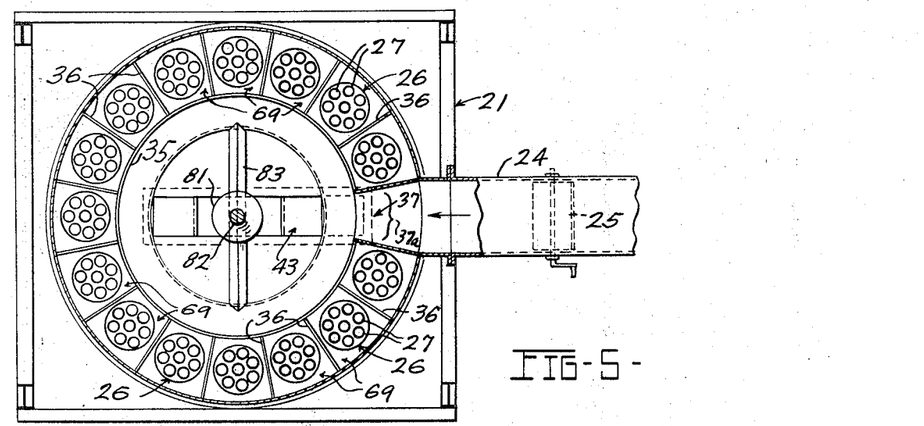
FIG. 5 is a horizontal, sectional view taken along the line 5—5 of FIG. 1.
Figure 7:
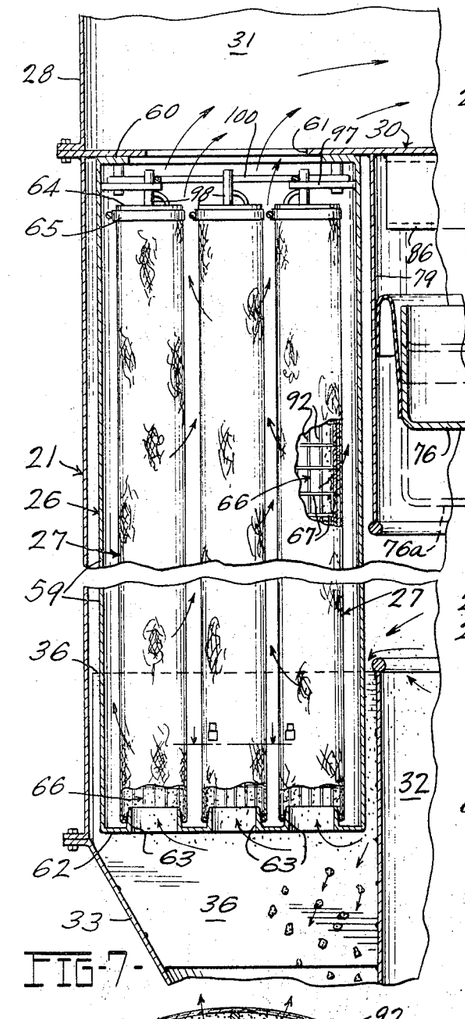
FIG. 7 is a fragmentary, vertical sectional view with parts broken away illustrating the flow of gases during the filtering operation, being shown on a further enlarged scale.
Figures 9, 10:
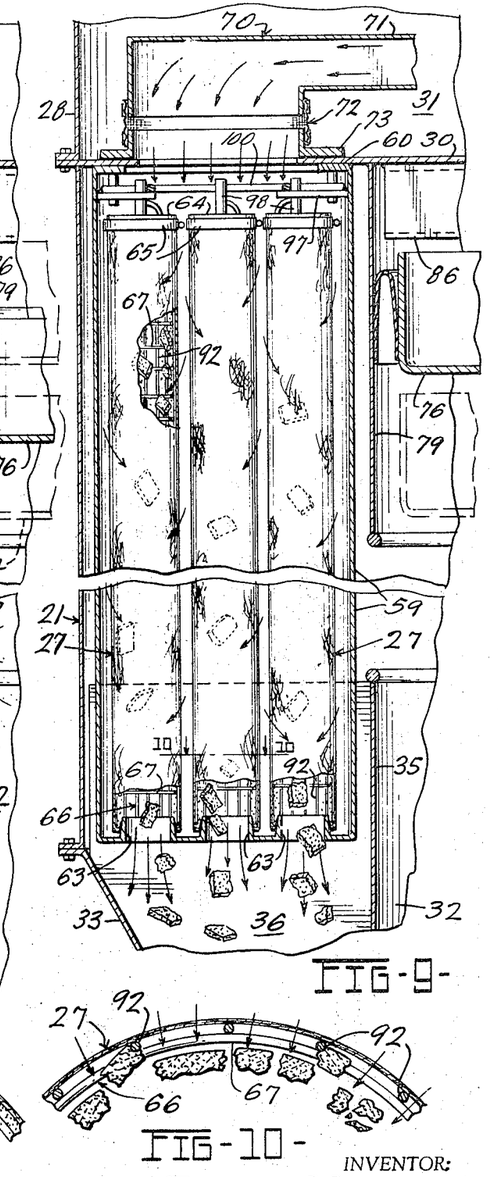
FIG. 9 is a fragmentary, vertical sectional view similar to FIG. 7 but illustrating the flow of gases during a cleaning cycle.
FIG. 10 is a view similar to FIG. 8 but taken along the line 10—10 of FIG. 9.

The input ducts 24 lead into the interior of the contaminated gas plenum housing 21 which encloses a plurality of filtering cells generally indicated by the reference number 26 and illustrated in detail in FIGS. 5, 7, and 9. The cells 26 are arranged in vertical parallelism and are oriented in a circumferential group (see FIG. 5). Each of the cells 26 encloses one or more individual filter bags 27. In this embodiment of the invention, there are 15 cells 26 and each of the cells 26 encloses eight filter bags 27, seven of them being arranged in a circumferential array with the eighth coaxially positioned in its cell 26. All of the filter bags 27 in each of the cells 26 extend vertically and parallel to each other.

Figure 3:
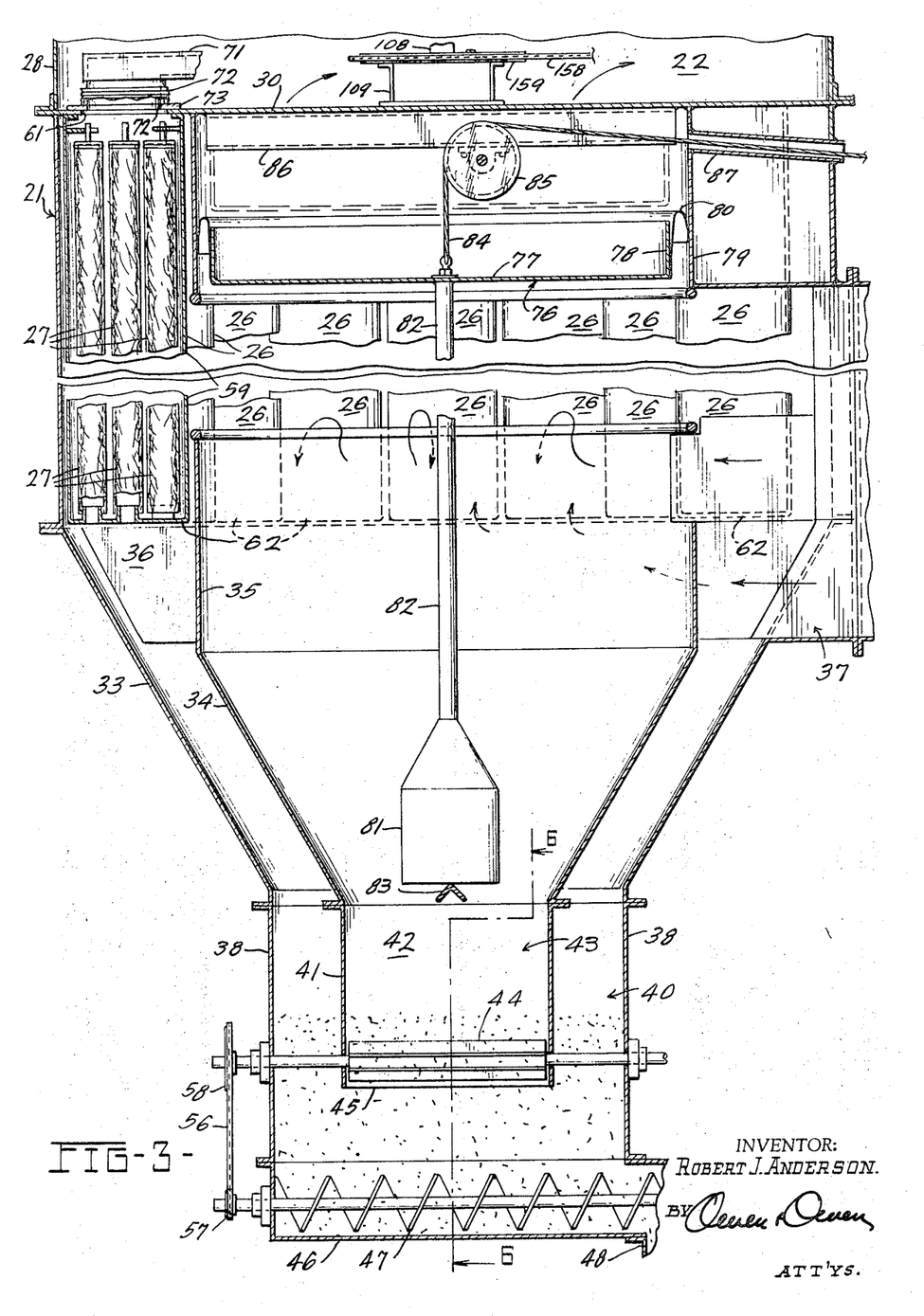
FIG. 3 is a fragmentary, vertical sectional view taken along a diametric plane of the filter, illustrating the contaminated gas plenum and dust collecting and discharging apparatuses, being shown on an enlarged scale relative to FIG. 1.

The clean gas plenum housing 22 is erected on top of the contaminated gas plenum housing 21 and comprises a generally circular wall 28, a roof 29 and a base plate or partition 30 (FIG. 3). The partition 30 separates a clean gas plenum generally indicated by the reference number 31, enclosed by the housing 21, from a contaminated gas plenum generally indicated by the reference number 32, which is enclosed by the housing 21 and includes the interior of the collecting hopper 23.

The collecting hopper 23 has an outer conical wall 33 (see also FIG. 3) which is connected to the bottom of the contaminated gas plenum housing 21 at its upper end and a conical wall of an inner hopper 34 which terminates at its upper end in an annular baffle 35. The annular baffle 35 is concentric with the contaminated gas housing 21 and is supported therein by a plurality of radial webs 36 (FIGS. 5). The radial webs 36 are welded to the outside of the annular baffle 35 and to the upper outer margin of the conical wall 33 (see also FIGS. 7 and 9). The annular baffle 35 extends upwardly above the level of the bottoms of the filter cells 26 and is vertically cut away in radial alignment with the inner end of the lowermost of the input ducts 24 (see FIGS. 3 and 5) to provide an opening 37 through the baffle 35 into the interior of the contaminated gas plenum 32.

Figure 4:
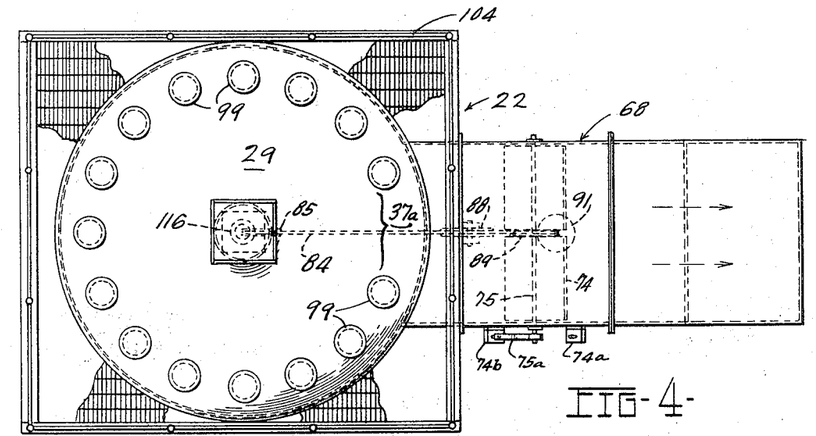
FIG. 4 is a top, plan view of the apparatus, being shown on the same scale as FIG. 1.

The inner ends of the input ducts 24 are stacked one above the other and, as can best be seen in FIG. 5, occupy one of sixteen even circumferentially extending segments within the housing 21, the other 15 such spaces being separated by the radial webs 36 and each enclosing the lower end of one of the filter cells 26. The blank segment is indicated in FIGS. 4 and 5 by a bracket and the reference number 37a.

Figure 6:
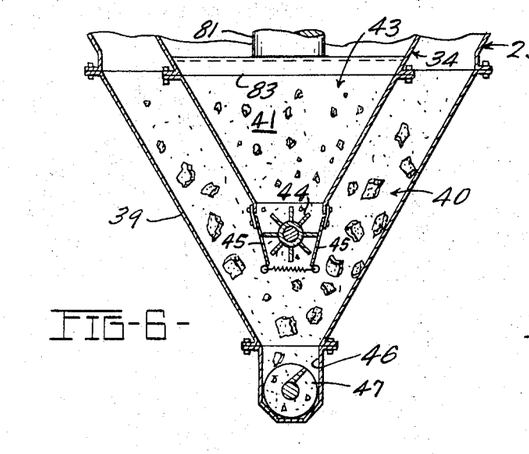
FIG. 6 is a fragmentary, vertical sectional view taken along the line 6—6 of FIG. 3.

The lower ends of both the outer and inner conical walls 33 and 34 are connected, respectively, to vertical, triangular end walls 38 and sidewalls 39 (FIGS. 3 and 6) of an outer dust receiver 40 and to triangular end walls 41 and inclined sidewalls 42 of an inner dust receiver 43.

The outer dust receiver 40 communicates with the space between the outer hopper wall 33 and the wall of the inner hopper 34 and the inner dust receiver 43 is open to the bottom of the inner hopper 34 and thus to the bottom of the contaminated gas plenum 32.

Particles deposited in the inner dust receiver 43 are discharged downwardly therefrom into the bottom of the outer dust receiver 40 by a rotating vaned gate 44 (see also FIG. 6) which rotates between a pair of inwardly urged sidewalls 45 so that gases are prevented from flowing downwardly during rotation of the gate 44. The lower end of the outer dust receiver 40 terminates in an elongated trough 46 in which a feeding screw 47 is located. The feeding screw 47 feeds dust and particles out of the bottom of the outer receiver 40 toward the end of the trough 46 and into the top of a short transverse trough 48 (FIG. 2) in which there is a rotating gate 49 similar in configuration and operation to the gate 44. A pressure airline 50 (FIG. 1) is connected to the bottom of the trough 48 and a conveyor pipe 51 leads from the trough 48 to a storage dump for the particulate material such as a bin, tank, or other location.

The screw 47 and gate 49 are driven by a drive chain 52 that is engaged with sprockets on the ends of their shafts and with a drive sprocket 53 on an output shaft of a gear box 54 powered by an electric motor 55. The upper gate 44 is driven by a drive chain 56 engaged with a sprocket 57 on the shaft of the screw 47 and with a sprocket 58 on the shaft of the upper gate 44.

FIG. 1-A fragmentarily illustrates a modified construction of the dust collecting hopper. In this modified construction a collecting hopper 23a has an outer conical wall 33a which connects with the bottom of the contaminated gas plenum housing 21a. The lower end of the collecting hopper 23a is connected to the upper end of a dust receiver 40a. An annular baffle 35a is positioned in a contaminated gas plenum 32a in the same location as the annular baffle 35 of the embodiment of the invention illustrated in FIG. 1.

In this second embodiment of the invention illustrated in FIG. 1-A, however, the inner hopper 34 is replaced by a flexible skirt 34a which is attached to the lower end of the baffle 35a and extends downwardly into line contact with the inner surface of the conical wall 33a.

FILTER CELLS

As mentioned, each of the 15 filter cells 26 encloses one or more filter bags 27, in this embodiment there being eight of the filter bags 27 in each of the filter cells 26. Each of the filter cells 26 comprises a tubular wall 59 (see also FIG. 7) that is connected by an annular flange 60 at its upper end to the underside of the partition 30 in concentricity with a circular opening 61 in the partition 30. Thus the upper end of each of the cells 26 is in communication with the clean gas plenum 31. The lower end of each of the cells 26 is closed by a plate 62 in which there are formed a plurality of upwardly extending necks 63, one for each of the eight filter bags 27. The filter bags 27 are tubular sleeves of felted or woven filtering medium, fabricated from fibrous materials of various types, including glass, and they are felted or woven tightly enough so that the interstices between the fibers are small enough to screen or filter out fine particles of dust down to the sizes of, say, 5 microns or less. The lower ends of the filter bags 27 are sealed to the necks 63 so that their lower ends are open to the spaces around the baffle 35 between the webs 36 and outside of the baffle 35.

Figure 8:
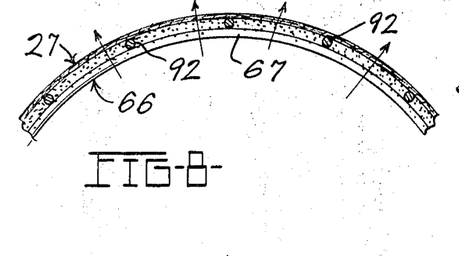
FIG. 8 is a fragmentary, horizontal sectional view taken from the position indicated by the line 8—8 of FIG. 7 and being shown on a still further enlarged scale.

The upper ends of the filter bags 27 are closed by caps 64 and are clamped to the caps 64 by rings 65. Each of the filter bags 27 is interiorly supported by a tubular wire cage 66 (FIGS. 7 and 8) which comprises vertically spaced horizontal wire rings 67. Thus the bottom of each cell 26 is closed and the bottom of each filter bag 27 is open relative to the contaminated gas plenum 32. In contrast, the top of each cell 26 is open and the top of each bag 27 is closed relative to the clean gas plenum 31. The clean gas plenum 31 (see FIG. 1) is connected to atmosphere by a large exhaust duct 68.

FILTERING OPERATION

Contaminated gas is fed under pressure through the input ducts 24 which are connected to the filter 20 with their dampers 25 open. The gases enter the contaminated gas plenum 32 and the largest, heaviest particles fall downwardly by gravity into the open center of the baffle 35 and inner hopper 34 accumulating in the inner dust receiver 43. The flow of contaminated gas is then downwardly through the relatively narrow passages at the outer side of the baffle 35 and between the baffle 35, the radial webs 36 and the outer walls of the filter cells 26, these spaces being indicated by the reference number 69 in FIG. 5. Because these passages are narrow, the velocity of the gas increases during its downward movement. The gases are then turned horizontally outwardly with an abrupt change of direction and are directed upwardly through the necks 63 into the interiors of the filter bags 27. This abrupt 180° change of direction causes a large percentage of the relatively heavy particles entrained in the gas to be projected downwardly into the annular space between the wall of the inner hopper 34 and the outer conical wall 33.

The gas flows upwardly into the interiors of the filter bags 27 and outwardly through the medium of which the bags are constructed into the interiors of the filter cells 26 leaving the contaminants on the inner surfaces of the filter bags 27 which gradually build up a cake of very compacted particles. The gas, now cleaned of larger particles by its 180° change of direction and having deposited the smaller particles on the inner surfaces of the filter bags 27, flows upwardly through the filter cells 26 and out of the openings 61 in the partition 30 into the clean gas plenum 31 whence it escapes through the exhaust duct 68 to atmosphere.

CLEANING OPERATION

Industrial dust filters usually are provided with means for cleaning accumulated dust cakes from the surfaces of the filter bags. In the instant invention, the cleaning of the filter bags is accomplished by a reverse blast of clean gas forced into the open upper ends of the cells 26, inwardly through the walls of the filter bags 27 and downwardly out of the open bottom ends of the filter bags 27. The reverse blast of gas is generated by a blast generator generally indicated by the reference number 70 which is located within the clean gas plenum 31. The gas blast generator 70 is specifically illustrated in FIGS. 13–16, inclusive, and will be more fully described below.

With reference to FIG. 9, the gas blast generator 70 delivers a measured volume of gas through a duct 71 and a collar 72 which is carried by a shoe 73 to the opening 61 in the partition 30 for each individual cell 26 which is to be cleaned. The generator 70 successively moves from cell to cell around the filter, sequentially placing its delivery duct 70 in communication with the cells 26 during a cleaning cycle. During normal operation of the filter, however, that is, while the filter bags 27 are relatively clean and before a cake of accumulated particles has built up on their interiors, the duct 71 and the shoe 73 are positioned on the partition 30 on a blank segment thereof above the input ducts 24, this blank segment being indicated in FIGS. 4 and 5 by the bracket and reference number 37a.

As will be more fully explained below, the gas blast generator 70 is entirely self-contained and is entirely located within the clean gas plenum 31 but, it will be understood, a generator for the cleaning blast could be located exteriorly of the plenum 31 and be serially connected by a suitable movable duct work to the 15 openings 61 above the 15 filter cells 26 when the filter bags 27 become dirty and need cleaning.

As a gaseous blast is delivered from the duct 71 into the opening 61 of a particular filter cell 26, a volume of gas which comprises both that volume interiorly of the particular cell 26 and exteriorly of the bags 27 as well as that volume of gas in the duct 71 and collar 72 and confined by the blast generator 70, is subjected to pressure created by the generator 70. A measured volume of that gas is forced through the filter bags 27 from the exterior, being initially delivered thereto with a substantial impact which cracks the caked material away from the interior surfaces of the filter bags 27 and expells the cracked and broken cake downwardly out of the open bottom ends of the filter bags 27, through the necks 63 and into the open annular area between the baffle 35 and the upper portion of the outer hopper wall 33. This action is illustrated in FIGS. 9 and 10.

Because the impact of the blast is delivered throughout the entire exterior surfaces of the filter bags 27 in the cell 26 being cleaned, the force is directed radially inwardly relative to each of the filter bags 27 and the cake and particles broken therefrom can move only downwardly out of the filter bags 27. Because of the rush of gas through the filter bags 27, there is practically no tendency for the dust particles to re-deposit upon the interior surfaces of the filter bags 27.

In a filter embodying the invention, for example, which is designed to filter 20,000 cubic feet of contaminated gas per minute, it has been found that the delivery of only 12 cubic feet of clean gas through an individual opening 61 of a filter cell 26, is all that is necessary to effectively break the caked material on the interior surfaces of the eight bags 27 therein and to expell such material from the open lower ends of the bags 27. Thus only 12 cubic feet of gas per filter cell or a total of 180 cubic feet of gas for the 15 cells is required for each cleaning cycle. Because of this low volume of cleaning gas and because the vertical downward blast of the cleaning gas expells the dust cake well down into the protected outer receiver 40, only the equivilent low volume of gas displaced from the receiver 40 can possibly be re-entrained into the gas streams entering the bottoms of all other cells 26 into which gas to be filtered is flowing.

A somewhat simplified and diagrammatic showing of the action of the blast of cleaning gas moving inwardly through the filter bags 27 to break away the accumulated cake is shown in FIG. 10.

In the modified construction illustrated in FIG. 1-A, intermediate weight particles which are directed downwardly by the inflow of contaminated gas along the outer margin of the annular baffle 35a accumulate in the annular area exteriorly of the skirt 34a during the filtering operation. During the cleaning operation, the blast of cleaning gas driven downwardly through the filter bags 27 expells from those bags the caked material and heavy particles (as illustrated in FIG. 9) and the force of the pieces of cake and particles thus projected as well as the force of the blast itself, flexes the skirt 34a inwardly so that particles accumulated between its outer surface and the inner side of the conical wall 33a are expelled downwardly into the dust receiver 40a.

DUST COLLECTION AND DISCHARGE

The horizontal radially inward flow of the gas along the lower ends of the filter cells 26 during filtering operations sets up an air curtain which aids in preventing re-entrainment of any expelled or diverted dust whether relatively fine or relatively large. In both of the modifications of the invention illustrated in FIGS. 1 and 1-A, the air curtains across the bottoms of the cells 26 are at a level substantially above either the bottom of the passage between the inner hopper 34 and the conical wall 33 or the space between the skirt 34a and the conical wall 33a (FIG. 1-A). Because of this substantial vertical spacing, re-entrainment of previously ejected or expelled particles is minimized. Dust, particles and broken cake may, therefore, be accumulated to a level about at the tops of the receivers 40 and 43, before it is necessary to operate the dust discharging apparatus comprising the screw 47 and associated mechanism. Operation of the motor 55 and the compressor for the source of air in the pipe 50 for only a few minutes out of each hour of filtering operation is possible. The exact length of operation, of course, depends upon the degree of contamination and volume of the gas being filtered. In any event, however, the ability to operate the dust discharge mechanism only intermittently and for only brief periods results in substantial savings of power, both to operate the motor 55 and to provide compressed air for the pipe 50. Significant savings also are realized from greatly minimized wear on the dust discharge and conveying apparatus.

PRESSURE CONTROL

In any filtering apparatus in which the contaminated gas is fed through filtering media, such as the filter bags 27 of the instant invention, the fine particles of dust which have not previously been eliminated from the contaminated gas gradually accumulate on the dirty side of the filter bags and build up a relatively dense "cake" of filtered material. As this cake builds up, of course, the resistance to passage of gas through the filter bags also increases. If some provision for maintaining a substantially constant pressure within the contaminated gas plenum 32 were not provided, the increasing resistance to passage of the gas through the filtering media would reflect back upon the fans by which the contaminated gas is delivered to the filtering apparatus, substantially affecting their gas delivery. It is well known that most fans deliver widely varying gas flows upon moderate changes in pressure. Therefore, maintaining a substantially constant pressure in the contaminated gas plenum is desirable in order that each or all of the fans delivering contaminated gas thereto will operate at the designed rate of flow, assuring optimum operation and utilization of power.

Secondly, in a filtering apparatus which is designed for the filtering of contaminated gas received from one or more sources, for example, from four independently operated and independently pressurized input ducts 24, as shown in FIG. 1, the volume of gas being fed under pressure into the contaminated gas plenum 32 depends upon the number being operated. This would cause changes in the pressure within the contaminated gas plenum 32 and would require changes in the operating conditions if means were not provided for maintaining a constant pressure therein.

As mentioned above, the clean gas plenum 31 is vented to atmosphere through the exhaust duct 68. The exhaust duct 68 is provided with a damper 74 that is rotatable on a horizontal shaft 75 and movable between the closed position illustrated in solid lines in FIG. 1 to a fully opened position illustrated in dotted lines in FIG. 1 and indicated by the reference number 74a.

Inasmuch as all of the gas flowing through the filter must exit out of the exhaust duct 68, the degree of openness of the damper 74 determines the open cross section of the duct 68 and thus the back pressure on the filtering apparatus. The accumulating cake of filtered material deposited on the inner walls of the filter bags 27 and the exhaust duct damper 74 both provide resistance to flow through the filter apparatus, being located in series between the input ducts 24 and the part of the exhaust duct 68 beyond the damper 74.

In accordance with the instant invention a substantially constant pressure is maintained within the contaminated gas plenum 32 to compensate for changes in resistance to flow of gas through the filtering media due either to build up of dust cake or to differences in volume of contaminated gas fed into the contaminated gas plenum 32 by reason of their being one or more, or all of the input ducts 24 open.

The damper 74 of the exhaust duct 68 is moved between open and closed positions by a pressure responsive piston 76 (FIG. 3) having the form of a pan with a circular bottom 77 extending horizontally across the top of the contaminated gas plenum 32, and a cylindrical rim 78. The piston 76 moves vertically in an open bottomed "cylinder" formed by an annular wall 79 which depends from the partition 30 and is concentric with the housing 21 and the filter 20 as a whole. The piston 76 is sealed to the wall 79 by a flexible rolling annular diaphragm 80. A weight 81 hangs on the lower end of a rod 82 which is secured at the center of the piston 76 to bias the piston 76 in a downward direction. A bar 83 extends horizontally across the bottom of the contaminated gas plenum 32 to support the weight 81 when the filter apparatus is not in operation (FIGS. 1 and 3). A cable 84 is attached at the center of the piston 76 and extends upwardly and over a pulley 85 which is journalled between a pair of transversely extending, spaced beams 86. The beams 86 are secured to the underside of the partition 30. After passing over the pulley 85, the cable 84 extends out of the housing 21 through a tube 87 which is open to atmosphere and then around a pulley 88 (FIG. 1) mounted on the outside of the filter apparatus. The cable 84 extends upwardly into the exhaust duct 68 and around a sheave 89 on the shaft 75 of the damper 74 and downwardly out of the exhaust duct 68. A weight hanger 90 is connected to the lower end of the cable 84 and removable weights 91 are supported thereon.

In the situation illustrated in FIG. 1 of the drawings, it is assumed that the filter apparatus is not functioning and that, although two of the ducts 24 are shown with their dampers 25 in open position, no contaminated gas actually is being fed from the ducts 24 into the filtering apparatus. As a result, there is no gauge pressure interiorly of the contaminated gas plenum 32 and the piston 76 is at its lowest level with the weight 81 resting on the crossbar 83 and the damper 74 closed.

When the filter is placed in operation and contaminated gas under pressure is fed into the contaminated gas plenum 32 from one or more of the ducts 24, pressure interiorly of the plenum 32 increases. This moves the piston 76 upwardly against the bias of the weight 81 to rotate the damper 74 from its closed position illustrated in FIG. 1 toward its open position. As the filtered material builds up on the inner surfaces of the filter bags 27, resistance to flow of the contaminated gas through the filter media increases which increases the pressure within the contaminated gas plenum 32 so that the piston 76 moves up a further distance, further opening the damper 74 to reduce the back pressure and maintain the interior pressure at the desired substantially constant level.

The piston 76 is thus responsive to changes in the differential pressure between the contaminated gas plenum 32 and the exhaust duct 68 beyond the damper 74, or to atmosphere, because the pipe 87 connects the space in the cylinder 79 above the piston 76 directly to atmosphere.

For example, if the filter apparatus is designed to operate at a positive pressure of, say, 4 inches of water, each of the fans or blowers in the ducts 24 would also be so designed to operate most efficiently to force contaminated gas into the contaminated gas plenum 32 against a "head" pressure therein of 4 inches of water. The resistance to this pressure is the sum of the resistance provided by the filtering media in all of the filter cells 26 plus the restriction imposed upon the exhaust duct 68 by the damper 74. Therefore, as the cake of filtered material builds up on the filter media, increasing its total resistance, the damper 74 automatically is opened to maintain substantially constant the total resistance of the filter to the passage of gas at the designed four inches of water. Similarly, when more than one of the input ducts 24 is feeding contaminated gas under pressure into the contaminated gas plenum 32, the increase in the volume of contaminated gas being fed there into would otherwise increase the pressure in the contaminated gas plenum 32 except for the fact that the piston 76 would be moved upwardly, thereby further opening the damper 74 to maintain the resistance at the designed 4 inches of water.

As a result, whether only one of the input ducts is being utilized or whether more than one is being utilized, the blower or fan for each input duct operates independently of the blowers or fans for the other input ducts since each of them is designed to feed the contaminated gas into the contaminated gas plenum 32 at the designed level.

The maintained internal pressure in the contaminated gas plenum 32 can be varied within maximum and minimum by removing or adding weights 91 to the hanger 90 because these weights act in a direction contrary to the biasing weight 81. Small adjustments may therefore be made as desired until the designed pressure of the blowers and fans has been met so that they can operate at their optimum efficiency regardless of the particular number of blowers or fans which are in operation to feed contaminated gas under pressure into the input ducts 24.

In FIG. 7, which illustrates the filtering operation, the piston 76 is also shown fragmentarily in an intermediate position above its lowermost position, which is shown in dotted lines and indicated by the reference number 76a. This condition prevails during filtering and prior to the time when the filter media have accumulated sufficient cakes of filtered particles to substantially increase the resistance to flow of the gases through the filter media. As mentioned above, as the filtering operation continues, the cake of particles on the inner surfaces of the filter bags 27 builds up, increasing the resistance to flow of gases therethrough and, in compensation therefore, the piston 76 rises, further opening the exhaust damper 74 to balance the pressure at the designed level.

When the filter cake has finally reached such thickness and, therefore, resistance to passage of the gas therethrough that it is necessary to clean the filter bags 27, the piston 76 has reached the top of its travel and the exhaust damper 74 has been swung completely open. This actuates a sensing device such as a limit switch 74a (FIG. 1) that is engaged by an arm 75a secured on the shaft 75 which energizes the blast generator 70 to commence a cleaning cycle. The cycle is terminated when the generator 70 completes a full revolution providing that the damper 74 has returned to a predetermined position near its closed position and has actuated a second limit switch 74b.

In FIG. 9 the piston 76 is fragmentarily shown at a level just below its uppermost limit of travel. The piston 76 left its uppermost limit immediately after the first filter cell 26 was cleaned and the resistance to gas flow through the filter media in that one of the cells 26 was greatly lessened so as a result, the pressure in the contaminated gas plenum reduced and the piston 76 lowered to swing the damper 74 away from its fully open position thus, again, to maintain the desired positive pressure within the contaminated gas plenum 32.

FILTER BAG MOUNTING

Figure 11:
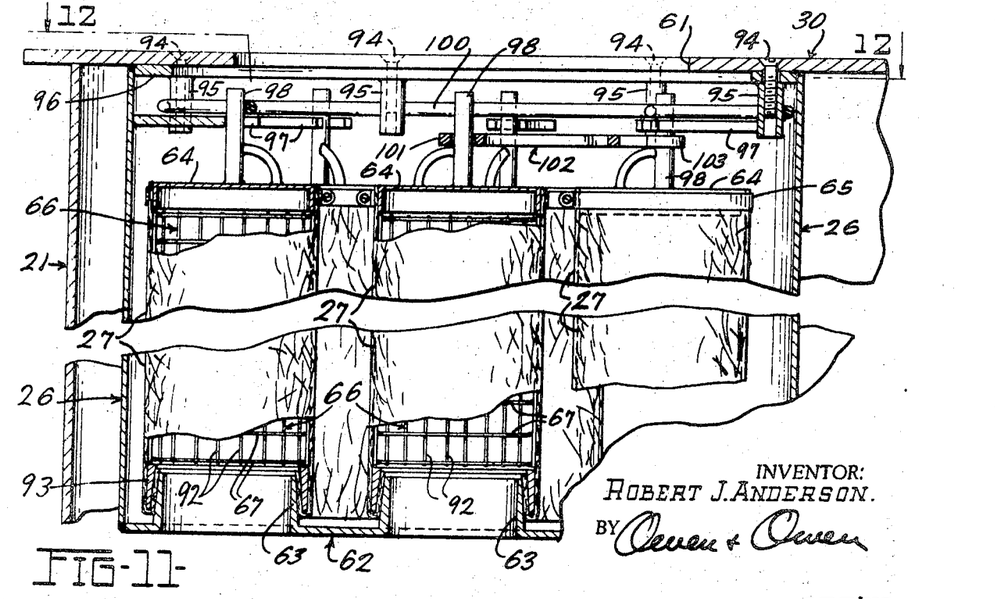
FIG. 11 is a fragmentary, vertical sectional view, with parts broken away, similar to FIGS. 7 and 9 but illustrating the mounting and support means for filter bags in an apparatus embodying the invention, being taken along the line 11—11 of FIG. 12.
Figure 12:
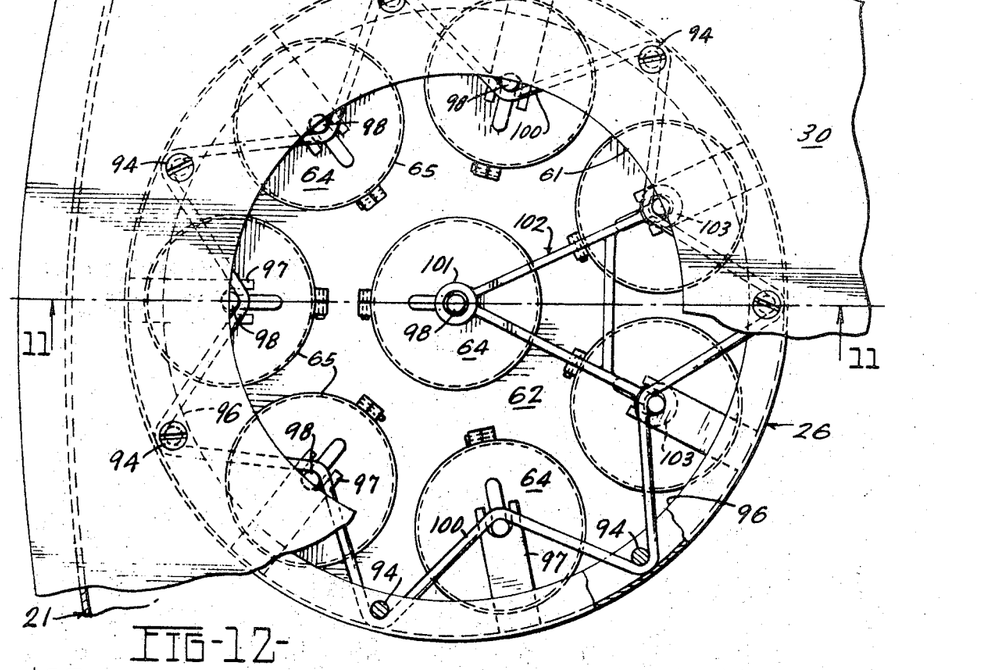
FIG. 12 is a fragmentary, horizontal plan view taken from the position indicated by the line 12—12 of FIG. 11.
Figure 13:
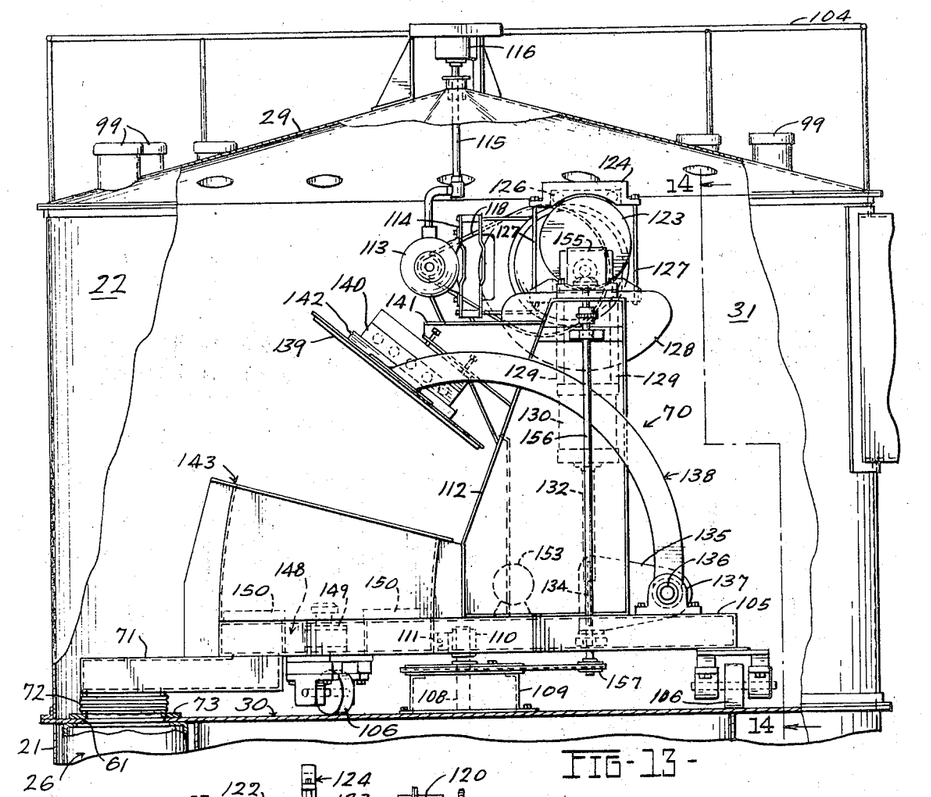
FIG. 13 is a view, partly in section and partly in elevation, and illustrating mechanism according to the invention for the generation of a blast of clean gas for cleaning the filter bags, located, in accordance with this embodiment of the invention, in the upper portion of the filter housing in the clean gas plenum and shown on a greatly enlarged scale relative to FIG. 1.

The instant invention also includes improved structural means for mounting the individual filter bags 27 within the respective filter cells 26. This structure is illustrated in FIGS. 11 and 12. Each of the tubular filter bags 27 is supported by one of the tubular wire cages 66 which consists not only of the wire rings 67 but also of longitudinally extending wires 92, the caps 64 at the top and tapered wall collars 93 at the bottom which telescope over the necks 63 that protrude upwardly from the bottom plates 62 of the filter cells 26.

A tubular filter bag 27 is slipped over a cage 66 until its upper end is circumjacent the rim of the cap 64. A clamping ring 65 is then tightened around the outside of the end of the bag 27 to clamp it to the rim of the cap 64 in a gas-tight joint. The other, lower end of the filter bag 27 is wrapped around the free edge of the respective collar 93 and adhered to the inside tapered surface of the collar 93. This stretches the filter bag 27 tightly over the cage 66. This operation so far is performed on the ground outside of the filter apparatus.

Each of the individual filter cells 26 is secured to the partition 30 co-axially with its respective opening 61 by means of a series of flat-head machine screws 94 which extend through drilled holes in the partition 30 and downwardly into the interior of threaded tubular nuts 95 which are welded or otherwise secured on the underside of an annular rim 96 at the top of the wall of the respective cell 26. An inwardly extending, notched, spacer plate 97 for each of the outer filter bags 27 is welded on the inner side of the wall of the cell 26 and protrudes horizontally inwardly towards the center. Each of the filter cage caps 64 has an axially extending stem 98.

In order to place a group of filter bags 27 into one of the cells 26, after the bags 27 are assembled on their cages 66, they are sent up to a workman standing on the roof 29. The workman on the roof 29 unscrews that one of a series of caps 99 which overlies the particular cell 26 in question. He then lowers each of the eight bags 27 on its cage 66 downwardly into the clean gas plenum 31 to another workman standing on the partition 30 near the opening 61 to that cell 26. This second workman inserts the lower end of the respective filter bag 27 downwardly through the cell opening 61 and thrusts the collar 93 over the respective one of the necks 63 pushing it downwardly to squeeze the turned over end of the filter bag 27 between the two tapered mating surfaces, i.e., the inside surface of the collar 93 and outside surface of the neck 63. He then swings the upper end of the cage 66 outwardly engaging its stem 98 in the notch in the respective one of the spacer plates 97 which has a depth such that full insertion of the stem 98 thereinto erects the particular filter cage 66 vertically. After all seven of the filter cages 64 and bags 27 in the circumferential array have been thus assembled within the respective cell 26, the workman stretches an endless resilient band 100 around the outer sides of the tubular nuts 95 and the inner sides of the stems 98 to seat the stems 98 in the notches of their respective spacer plates 97 and retain the array of filter bags 27 in a circumferential group.

The central bag 27 and its cage 66 are identical with the bags 27 and cages 66 of the seven in the peripheral group but its mounting is somewhat different. After the lower end of the central cage 66 has been telescoped over the central neck 63, an eye 101 of a "wishbone" 102 is to be placed over the stem 68. The "wishbone" 102 has two horizontal, divergent arms and a similar eye 103 is located at the end of each of the arms of the wishbone 102. The band 100 is lifted off of the stems 98 of two adjacent ones of the outer cages 66 and these two cages 66 are tilted inwardly and the eyes 103 are slid downwardly over their stems 98. The workman then moves the wishbone 102 radially outwardly to thrust the stems 98 of these two bags into the notches in the respective spacer plates 97 and presses the eye 101 downwardly over the stem 98 of the central cage 66. The operator then stretches the band 100 to reengage it around the inner sides of the stems 98 of the two cages 66 with which the eyes 103 are also engaged.

When it is desired to remove the filter bags 27 from the cells 26, a workman in the clean gas plenum 31 disengages the elastic band 100 and the wishbone 102 to free the filter bag cages 66. He then hands the filter bag cages, commencing with the central cage 66, upwardly through the respective opening provided by removal of the respective cap 99 to a workman standing on the roof 29. Such a filter cage is shown in intermediate position in FIG. 1 as extending upwardly through one of the openings in the roof 29 from which its cap 99 has been removed. A guardrail and walkway, generally indicated by the reference number 104 may be provided around the roof as a safety measure.

Because the interior workman is standing in the clean gas plenum 31 and because the interior surfaces of the filter bags 27 have accumulated the filtered dust, the workman is operating in a clean environment. By reason of the simplicity of disengagement of the structure shown in FIGS. 11 and 12, the workman is not required to use any tools for disassembly and removal of the filter bags 27 in their cages 64 nor for their reinsertion. It is possible, therefore, to replace worn filter bags 27 in the entire filtering apparatus within a period of a relatively short time, in practice something in the order of approximately 75 minutes.

CLEANING GAS BLAST GENERATOR

The cleaning gas blast generator 70 is illustrated in FIGS. 13–16 inclusive. In this embodiment of the instant invention, the blast generator 70 is physically located within the clean gas plenum 31 and is so shown in FIGS. 13 and 15. The generator 70 is mounted on and carried by a bed 105 that rides on three heavy casters 106 which follow a circular path 107 on the heavy partition 30. The bed 105 and thus the generator 70 rotates around a vertical center determined by a stub shaft 108 (FIG. 13) that is mounted in a pedestal 109 at the center of the partition 30 and which extends upwardly into a journal 110 (see also FIG. 16) which is mounted on a massive cross beam 111 of the bed 105.

A pair of heavy supports 112 are erected on the bed 105 and extend upwardly therefrom in parallelism for the support of various portions of the mechanism. An electric motor 113 is mounted on a suitable bracket 114 on the upper end of the supports 112 and is connected by an electrical conduit to a rotatable power connector box 116 at the center of the roof 29.

A drive pulley 117 on the shaft of the motor 113 is connected by a belt 118 to an input pulley 119 of a shaft mounted, reducing gear box 120. The gear box 120 transmits power to a main shaft 121 rotatably mounted in journals 122 which are bolted to the tops of the supports 112. A circular cam 123 is eccentrically mounted on the shaft 121 being rotatable relative to the shaft 121. The periphery of the cam 123 is embraced by a cam yoke 124 comprising upper and lower saddles 125. Each of the saddles 125 has a pair of rollers 126 which ride the surface of the cam 123 and the two saddles 125 are connected by tie bolts 127. Thus as the shaft 121 rotates, the eccentric circular cam 123 raises and lowers the yoke 124 through a stroke determined by the eccentricity of the mounting of the cam 123 on the shaft 121. A pair of lobe-shaped counter weights 128 are also mounted on the shaft 121 being located opposite the cam 123 for a counter balancing purpose to be discussed below.

The cam yoke 124 is connected by struts 129 to the top of an air cylinder 130. A piston rod 131 of the cylinder 130 is threaded into the top end of a bifurcated link 132. A cross pin 133 extends between the lower ends of the arms of the bifurcated link 132 and through an elongated slot 134 in a bell-crank arm 135. The crank arm is fixed on a massive tubular crank shaft 136 which is mounted by heavy journals 137 on the bed 105 and extends across the bed 105 in a direction that is parallel to the main drive shaft 121. A pair of massive curved arms 138 are rigidly connected at their lower ends to the heavy tubular crank shaft 136 and extend upwardly and forwardly along the outer sides of the supports 112. The free ends of the curved arms 138 are rigidly secured to a heavy rectangular plate 139.

In the inoperative position of the generator 70 (illustrated in FIGS. 13–15) the plate 139 is held in its upper, remote position by a powerful permanent magnet 140 that is carried by a pair of forwardly protruding, cantilever arms 141 and which engages a contact plate 142 attached on the back of the heavy plate 139 between the ends of the curved arms 138.

A compression box generally indicated by the reference number 143 is mounted on the forward side of the bed 105 and has an open top 144 of the same cross sectional configuration as the perimeter configuration of the plate 139 with which it is, therefore, complementary. Sidewalls 145 of the compression box 143 are vertical and flat. Front wall 146 and back wall 147 of the compression box 143 are, however, cylindrically curved around the center of the heavy crank shaft 136 about which the curved arms 138 swing. The compression box 143 has an open bottom 148 connected through the triangular duct 71 to the collar 72 and the shoe 73. A shock absorbing dash pot 149 and resilient pads 150 are positioned within the box 143 to be engaged by the heavy plate 139 at the bottom of its stroke into and through the box 143.

A second sheave of the drive pulley 117 is connected by a belt 151 to the input shaft of an air compressor 152 which maintains a pre-determined pressure in a small tank 153. The air tank 153 is connected by a line 154 to the cylinder 130 to maintain its piston fully retracted therein so that the cylinder 130 and its piston rod 131 normally act as a shock absorbing strut effective between the cam yoke 124 and the weight of the curved arms 138 and the plate 139 at the extremities of the slot 134 in the bell crank 135.

The electric motor 113 also provides power for rotating the bed 105 and the generator 70 upon its casters 106. The end of the main shaft 121 remote from the input pulley 119, is coupled to the input shaft of a right angle gear box 155, of which the output shaft is coupled to a vertical transmission shaft 156 which has a small sprocket 157 (FIG. 14) on its lower end. The sprocket 157 is engaged by a chain 158 which also extends around and is engaged with a stationary "sun" sprocket 159 fixed to the top of the pedestal 109 and concentric with the center shaft 108. A biased idler sprocket 160 keeps the chain 158 taut. Thus, rotation of the vertical transmission shaft 156 and the sprocket 157 swings the entire generator 70 around the central shaft 108.

BLAST GENERATOR OPERATION

During inactivity, i.e., when the filter bags 27 are relatively clean and the exhaust damper 74 has not yet been fully opened, as explained above, the shoe 73 of the generator 70 is positioned over the closed segment indicated by the reference number 37a and located above the input ducts 24. However, when the filter bags 27 become heavily enough caked so that their resistance rises to a point where the pressure balancing mechanism described above opens the exhaust damper 74 as far as possible, this condition actuates a mechanism such as a limit switch (not shown) to energize the motor 113 of the generator 70. The generator 70 then begins to rotate on its center shaft 108 until the shoe 73 overlies the opening 61 of the first adjacent filter cell 26. During this initial rotation of the generator 70, the eccentric circular cam 123 is moved downwardly from its upper rest position (FIG. 13) to a position approximately 165° removed therefrom so that the cross pin 133 engages the bottom end of the slot 134 in the bell crank 135. This delivers thrust to the bell crank 135, and torque to the shaft 136 which swings the pair of curved arms 138 downwardly from the rest position shown in FIG. 13 (dotted lines FIG. 16) sufficient to release the contact plate 142 from the permanent magnet 140.

Gravity then accelerates the downward movement of the heavy plate 139 on its arms 138. The plate 139 enters the open top 144 of the compression box 143 establishing a pneumatic seal therewith by reason of a wiper 161 on the edges of the plate 139. The plate 139 instantaneously closes the compression box 143 trapping a measured volume of clean gas within the compression box 143 (12 cubic feet in the embodiment of the invention herein described). The substantially instantaneous pressure thus generated by the entry of the plate 139 into the open top of the compression box 143 is transmitted in the form of a sharp impact through the clean gas within the respective one of the filter cells 26 outside of the filter bags 27. The impact of the blast of clean gas created by the released kinetic energy cracks the accumulated cake of filtered material on the interior surfaces of the filter bags 27 and, as the weighted plate 139 continues to fall downwardly through the compression box 143, the volume of clean gas measured by the interior of the compression box 143, is forced via the duct 71 in a reverse flow direction through the filter bags 27. This expels not only the previously caked, now cracked filtered material but also such particles as may have broken loose from the cake and be located interiorly of the filter bags 27, downwardly through the open necks 63 at the bottoms of the filter bags 27 and into the outer annular space between the conical wall 33 and inner hopper 34. At the bottom of the movement of the plate 139 through the compression box 143, it impacts against the dash pots 149 and pads 150 to terminate its stroke.

During the period of time involved between the separation of the contact plate 142 from the magnet 140 and the end of the path of movement of the plate 139 at the bottom of the compression box 143, the motor 113 has continued to rotate and the circular cam 123 has moved through its lower dead center (180°), and started to rise, thus lifting the cam yoke 124 and the bifurcated link 132 until the cross pin 133 engages the upper end of the slot 134 in the bell crank 135. At this point the bell crank 135 is swung in a clockwise direction (FIG. 16) to apply torque to the shaft 136 and to raise the curved arms 138 and the plate 139 upwardly from the bottom of the compression box 143 until, once again, the contact plate 142 engages the magnet 140. This re-engagement occurs just slightly prior to the time when the cam yoke 124 reaches its uppermost position so that the contact plate 142 is firmly seated against the magnet 140. During the time when the lifting force is being applied to the weight of the curved arms 138 and the plate 139, the counterweights 128 have passed over upper dead center and are moving downwardly. Their weight thus counterbalances the weight being lifted so as to reduce the peak power required to be delivered to the mechanism by the motor 113 in order to restore the compression plate 139 to its uppermost position.

The air cylinder 130 functions primarily as a safety feature. In the event that the massive plate 139 were to break loose from its uppermost position (FIG. 15) so that it would fall downwardly, rapidly rotating the shaft 136 and swinging the bell crank 135, abrupt engagement of the cross pin 133 with the upper end of the slot 134 would transmit sudden shock to the cam yoke 124 and the mechanism connected thereto. However, if such an accident were to occur, at the time of the engagement of the cross pin 133 with the upper end of the slot 134, the piston 130 would act as a shock absorber, the pressure therein being only sufficient normally to retain the piston rod 131 in retracted position, and the piston rod 131 would be pulled downwardly in the cylinder 130 to absorb the shock of this action. Conversely, if the plate 139 were to jam at the bottom of the compression box 143, when the cam yoke 124 applied upward pulling force to the cylinder 130, again the piston rod 131 would be pulled out of the cylinder 130 against the air under compression therein rather than transmitting force to the drive mechanism.

During the entire cycle required for the cleaning of all fifteen of the filter cells 26, the motor 113 continuously rotates. The timing provided by the various belts, pulleys, and shafts, is such that the shoe 73 is centered over each of the successive openings 61 for the filter cells 26 in timed relationship to the release of the plate 139.

Figures 14, 17:
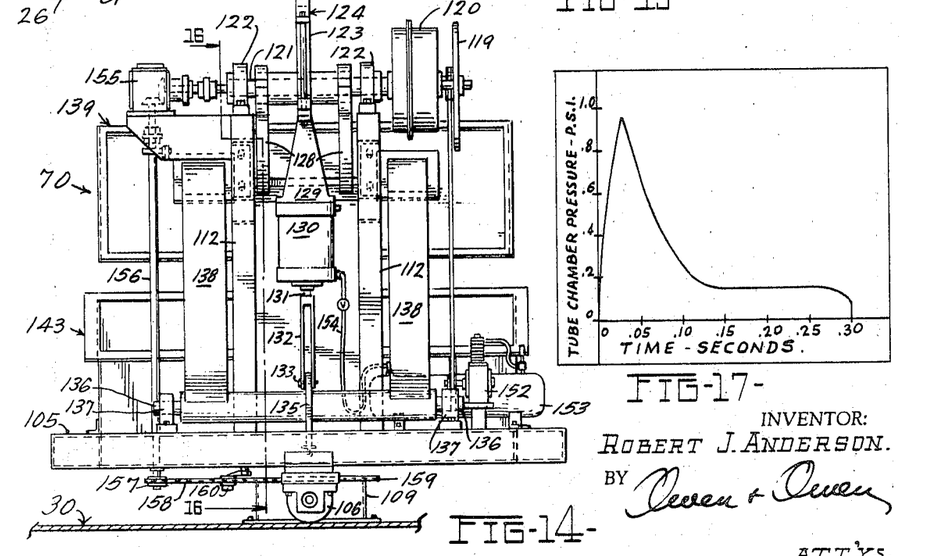
FIG. 14 is a side view in elevation taken from the position indicated by the line 14—14 of FIG. 13.
FIG. 17 is a time-pressure curve illustrating the pressure created adjacent the outer sides of the filter bags by the blast generator illustrated in FIGS. 13–16.

FIG. 17 is a trace of an oscilloscope display of the actual time-pressure curve within one of the filter cells 26 exteriorly of the filter bags 27 and covers the period of time beginning when the heavy plate 139 first enters the compression box 143 until it comes to a stop against the pads 150 at the bottom of the compression box 143. It can be seen that by reason of the fact that the plate 139 traps a measured volume of clean gas interiorly of the compression box 143 and applies to that measured volume the kinetic energy accumulated during its drop from the upper position illustrated in broken lines FIG. 16, the pressure within the total volume of gas to which it is applied rises extremely rapidly, almost instantaneously, to a peak and then falls off rather rapidly as the cake of accumulated material is discharged from the inner surfaces of the filter bags 27.

The blast of clean gas generated by the generator 70 is created by delivering to the predetermined volume of clean gas, including that enclosed within the respective filter cell 26 exteriorly of the bags 27, and that trapped within the compression box 143, a sharp impact, almost explosive in nature, rising to its highest peak within a period of time of about 25 milliseconds.

Because the plate 139 is dropping under the force of gravity after having been released from the retaining magnet 140, its speed accelerates between its uppermost remote position (FIG. 15) and the instant of its entry into the compression box 143. Because the clean gas trapped within the compression box 143 has a definite measured volume it is that volume of gas which is displaced by the further movement of the plate 139 through the compression box 143 and actually flows through the filter bags 27. Because the filter cell 26 being cleaned is closed surrounding the filter bag 27 the impact generated is delivered to all of the exterior surfaces of the filter bags 27 simultaneously and the filter cake is broken loose from all of the filter bags 27 in an inward direction as diagrammatically shown in FIGS. 9 and 10. The continuing movement of the plate 139 downwardly through the compression box 143 displaces a definite measured volume of clean gas from the compression box 143 and displaces from the gas within the filter cell 26 the equivalent of that measured volume through the filter bags 27.

As has been mentioned, the blast of gas delivered from the compression box 143 has a volume of approximately 12 cubic feet. This volume was selected from the apparatus herein disclosed because the volume of the eight bags 27 is approximately 9 cubic feet. In order to completely "flush" the eight bags 27 in one of the cells 26, at least 9 cubic feet would therefore be required and the additional 3 cubic feet was provided in order to insure that "suspended" particles near the upper ends of the bags 27 are expelled downwardly beyond the cells 26 and well into the outer dust receiver 40.

By calculation and actual measurement, approximately 2.5 cubic feet of gas is flowed through the bags 27 within the first 25 milliseconds during which the pressure in the cell reaches its peak as shown by the curve of FIG. 17. This effectively breaks the cake of accumulated dust (see FIG. 10).

Immediately after the 25 millisecond impulse (the peak point in the curve of FIG. 17), pressure within the filter cell 26 drops rapidly and the cake which has been dislodged from the inner surfaces of the filter bags 27 is expelled downwardly by continuing flow of most of the remaining 9.5 cubic feet of gas through the lower necks 63 by the time (approximately 0.13 seconds) when the curve (as illustrated in FIG. 17) levels out. The following more or less horizontal portion of the curve between an elapsed time of 0.13 seconds and 0.25 seconds represents the period during which the last of the clean gas flows out of the compression box 143 and into the interior of the filter cell 26. Following the elapsed time of 0.25 seconds and until the plate 139 reaches the bottom of the compression box 143 at elapsed time of 0.30 seconds, the pressure within the filter cell 26 reduces along a curve as the plate 139 strikes the dash pot 149 and pads 150. The elapsed time for the cleaning of each filter cell 26 is thus in the order of no more than 0.30 seconds from the time when the plate 139 enters the open upper end of the compression box 143 until it completes its travel therethrough.

The delay time provided by the "lost motion" connection between the cross pin 133 and the slot 134 (when the plate 139 is at the bottom of the box 143) leaves the plate 139 at the bottom for a sufficient period of time to allow the particles dislodged from the upper ends of the bags 27 to move out of the lower ends of the bags 27 and into the receiver 40. Similarly the circumferential length of the shoe 73 is enough greater than the diameter of the opening 61 so that the top of the cell 26 remains closed such period of time. This delay time and closed time prevents the re-initiation of upward flow of gas being filtered which would interfere with the expulsion of the previously filtered material, until the expelled material is below the level where it would be re-entrained.

Therefore, each of the filter cells 26 is blocked and filtration therethrough prevented for only approximately 1 second. This is a total of the time for the passage of the plate 139 downwardly through the box 143 plus the above discussed delay time.

Following the delay time, the mechanism disclosed in FIGS. 13–16, inclusive, applies force to the bell crank 135, and the plate 139 is raised upwardly out of the compression box 143 and back up to its rest position where it is retained by the permanent magnet 140.

Figures 15, 16:
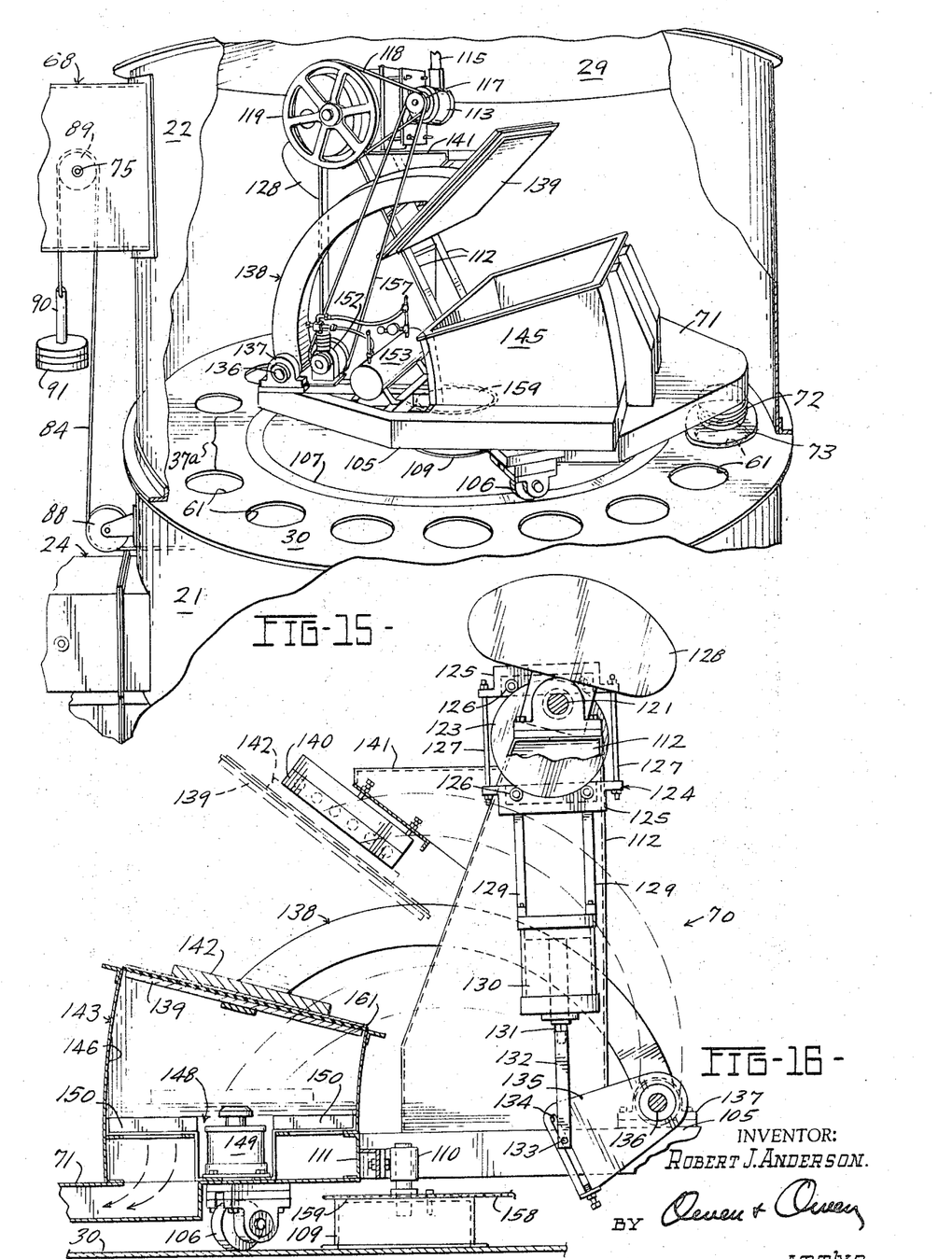
FIG. 15 is a perspective view of the gas blast generator illustrated in FIGS. 13 and 14, with other parts broken away.
FIG. 16 is a fragmentary, vertical sectional view taken along the line 16—16 of FIG. 14.

Because the total elapsed time for actually generating the delivering the blast of clean gas, including the falling time from the upper remote position in FIG. 15, to the completion of the movement of the plate 139 through the compression box 143, is well within a maximum period of ½ second, it follows that the entire generator 70 may be continuously moved around its axis on the stub shaft 108 and need not be stopped in position over each of the cell openings 61.

In a filter apparatus according to the invention wherein the compression box 143 has an interior volume of only 12 cubic feet, it has been found that an entire cleaning cycle comprising the cleaning of all fifteen of the filter cells 26 may be accomplished within a total elapsed time of less than 2 minutes, including not only the generation and delivery of fifteen successive blasts of clean gas, but also including the travel time from the starting position with the shoe 73 overlying the blank space 37a until the entire revolution has been completed and the shoe 73 has again been returned to the blank space 37a.

What I claim is:

1. A method for cleaning an elongated tubular filter bag by discharging accumulated dust from the interior surface of the bag, such bag having an open end and a closed end, such dust having accumulated on the interior surface of the bag by the flow of contaminant containing gas into the open end of the bag and passage of such gas transversely through the bag and into an enclosure that surrounds the bag and that has an open end at the closed end of the bag and an opposite end which is closed except for an opening coincident with the open end of the bag, said method comprising, supporting the bag substantially rigidly against inward collapse, generating a substantially instantaneous high pressure in the gas in the enclosure exteriorly of the bag by directing a blast of a predetermined volume of clean gas into the enclosure exteriorly of the bag and flowing an equivalent volume of gas radially inwardly through the walls of the bag for dislodging the accumulated dust from the interior surface of the bag and expelling such dust axially out of the open end of the bag.

2. A method according to claim 1 in which there are a plurality of tubular filter bags in the enclosure that are arranged parallel to each other in the flow path of the gas both during filtering and during the cleaning of such bags.

3. A method according to claim 1 in which there are a plurality of enclosures in the filtering apparatus, each of said enclosures enclosing at least one filter bag, and contaminated gas is flowed into the open ends of the filter bags in the others of such enclosures while accumulated dust is being discharged from a bag in the enclosure in which the high pressure is generated for cleaning the bag therein.

4. A method according to claim 3 and the step of directing the dust that is expelled from a bag being cleaned into a region remote from the contaminated gas flowing into the filter bags within the others of said enclosures.

5. A method according to claim 3 and the step of directing the dust that is expelled from a bag being cleaned along a path remote from the path of incoming contaminated gas flowing into the filter bags within the others of said enclosures.

6. A dust filter having, in combination, a contaminated gas plenum, a plurality of separately operable contaminated gas input ducts leading to said contaminated gas plenum, a clean gas plenum, said plenums being in communication, filtering media across the flow path of gas from said contaminated gas plenum to said clean gas plenum, an output duct leading from said clean gas plenum, a damper located in said output duct, said media and said damper being sequentially positioned in the flow path of gas through said filter, actuating means responsive to changes in the differential pressure between spaced positions in such flow path between which positions there is located at least both said media and said damper, for opening said damper as pressure drop across said media increases and for closing said damper as pressure drop across said media decreases for maintaining such differential pressure substantially constant, and separate, independently operable means for creating a flow of gas in each of said input ducts.

7. A dust filter according to claim 6 in which the actuating means comprises a cylinder and a piston that is vertically movable in said cylinder, the bottom of said piston being exposed to the contaminated gas plenum, and the top of said cylinder being vented beyond said damper, and drive means connecting said piston to said damper for opening and closing said damper.

* * * * *